United States Patent [19]

Brobeck et al.

[11] Patent Number: 4,482,304

[45] Date of Patent: Nov. 13, 1984

[54] COMPRESSOR OF A TYPE INCORPORATED IN AN EXHAUST GAS TURBOCHARGER

[75] Inventors: Helmut Brobeck, Hessheim; Hartmut Ludewig, Frankenthal; Wolfgang Miribel, Rodenbach; Helmut Stönner, Frankenthal, all of Fed. Rep. of Germany

[73] Assignee: Aktiengesellschaft Kühnle, Kopp & Kausch, Fed. Rep. of Germany

[21] Appl. No.: 303,098

[22] Filed: Sep. 17, 1981

[30] Foreign Application Priority Data

Sep. 30, 1980 [DE] Fed. Rep. of Germany ....... 3036890
Aug. 6, 1981 [DE] Fed. Rep. of Germany ....... 3131190

[51] Int. Cl.³ ...................... F04D 29/66; F04D 25/02
[52] U.S. Cl. ..................................... 417/407; 415/119
[58] Field of Search ............... 417/405, 406, 407, 409; 415/119

[56] References Cited

U.S. PATENT DOCUMENTS

| | | | |
|---|---|---|---|
| 1,418,238 | 5/1922 | Cramer | 415/119 |
| 2,036,058 | 3/1936 | Lang | 415/119 |
| 2,360,211 | 10/1944 | Doughman | 415/119 |
| 2,843,314 | 7/1958 | Hansen | 415/119 |
| 3,089,314 | 5/1963 | Speaker | 415/119 |
| 3,106,381 | 10/1963 | Leins | 415/119 |
| 3,330,476 | 7/1967 | Bruyere | 415/119 |
| 3,421,597 | 1/1969 | Blau | 415/119 |
| 3,500,754 | 3/1970 | Boes | 415/119 |
| 4,235,484 | 11/1980 | Owen et al. | 308/122 |

FOREIGN PATENT DOCUMENTS 3005873 9/1980 Fed. Rep. of Germany .

OTHER PUBLICATIONS

Konstruktion, "Passungsspiel und Verschleiss Schwingender Systeme", vol. 28, No. 9, 1976, pp. 332–339.

Primary Examiner—Douglas Hart
Attorney, Agent, or Firm—Hill, Van Santen, Steadman & Simpson

[57] ABSTRACT

In a compressor, in particular for exhaust gas turbochargers, the compressor housing rear wall of the compressor housing enclosing the compressor wheel is mounted on a stator housing for mounting the drive shaft. The compressor housing rear wall is divided into a central disk and at least one outer ring, at least one vibration-damping and structure-borne sound-damping separating ring surrounding the central disk peripherally connecting the two adjoining housing wall portions together. Between the separating ring and the housing wall portions one or two metal bushings are inserted in which the housing wall is held frictionally and/or in form-locking manner.

10 Claims, 7 Drawing Figures

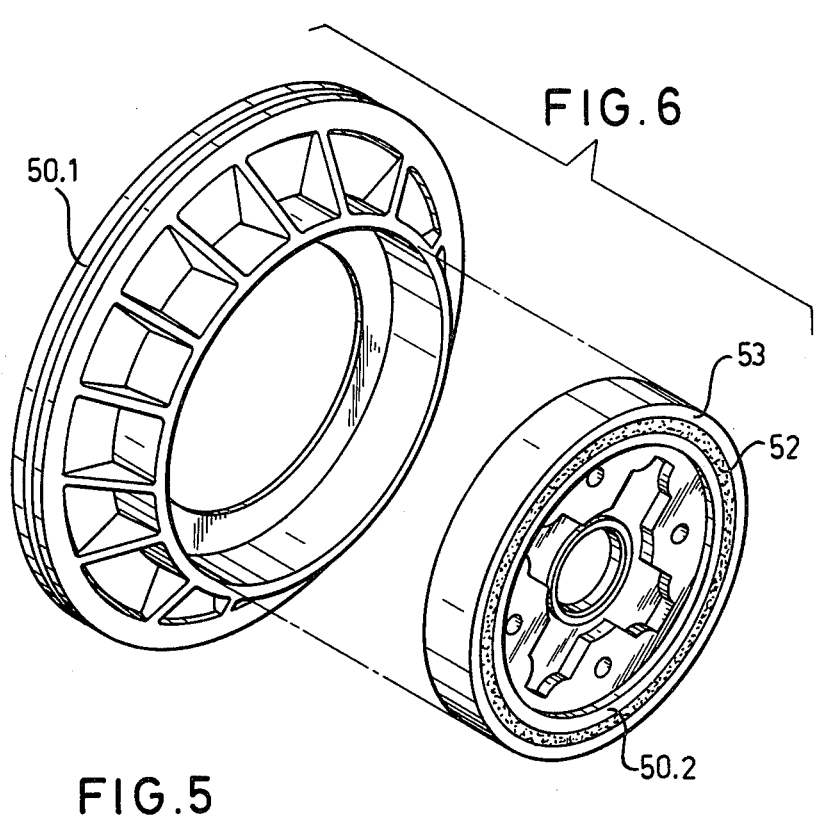
FIG. 6
FIG. 5
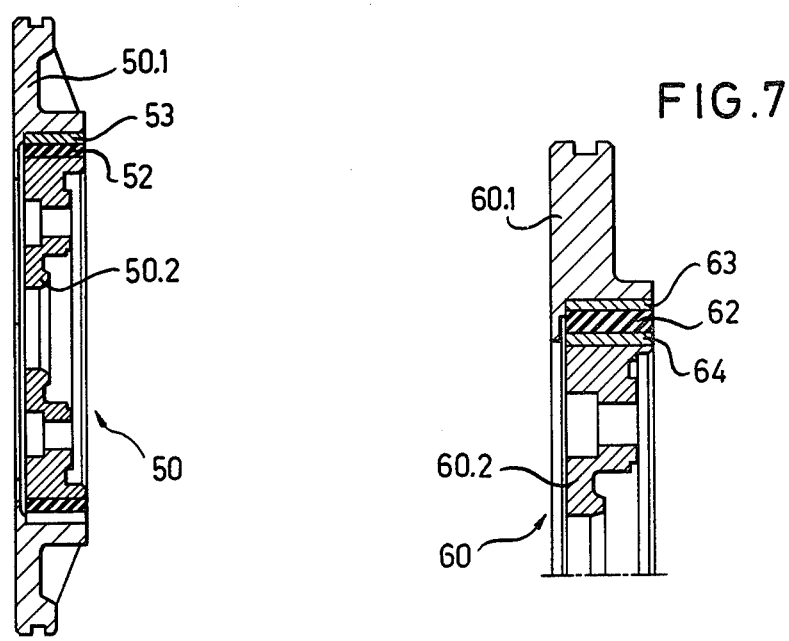
FIG. 7

COMPRESSOR OF A TYPE INCORPORATED IN AN EXHAUST GAS TURBOCHARGER

BACKGROUND OF THE INVENTION

This invention relates to a compressor, of a type which can be incorporated in an exhaust-gas turbocharger, comprising a compressor housing enclosing a compressor wheel and fastened, by its rear wall, to a stator housing mounting a drive shaft, and to a method of establishing a damping within the compressor housing rear wall.

Known high-speed compressors, more especially of the type incorporated in exhaust-gas turbochargers, produce considerable noise because the material or materials from which the compressor is made allow easy passage therethrough of any mechanical vibrations produced by the compressor during its operation. The vibrations causing the noise are produced, for example, by the rotation of the rotor when it is in imbalance. These mechanical vibrations (or oscillations) are passed on by way of the stator components and are radiated at the compressor housing. In this respect, resonance phenomena arise at the compressor housing and the rear wall thereof.

The level of this noise, which can be very burdensome when it is in the high frequency region, is extremely difficult to reduce. One solution for reducing the level of noise, which has been used with some success, is the very fine balancing of the rotor. This solution has proved, however, extremely expensive to adopt. Moreover, the center of balance of the rotor shifts during its operation, so that any noise reduction can only be achieved for a short time. The main cause of the increase in the level of noise during operation of the compressor is because of newly-arising imbalances at the rotor as a result of wear and ageing, and also thermal distortions or elastic-plastic deformations of the rotor as a result of mechanical stresses due to centrifugal forces, as well as internal moments of the bend-soft rotor.

The possibility does exist of improving the damping of the conduction of sound through the compressor between rotor and stator by an enlargement of the damping gap of the friction bearings, but this solution has only a slight value, since in the interests of a smooth shaft run, i.e. an optimizing of the bearing-rotor system from the rotor-dynamic point of view, changes in the size of the bearing gap are scarcely permissible.

Finally, the level of noise produced by the compressor can also be affected by a difference in the mass ratios between the compressor housing in the compressor housing's rear wall. However, this latter solution results in a compressor of considerably higher weight, in which respect hindrances of other functions occur, and an economical mass production of the compressor is hardly possible.

The mounting of the separating ring directly on the two portions of the compressor housing rear wall may be complicated for the production, in particular because an optimum material for the separating ring may not form a good bond with the parts of the compressor housing rear wall which is normally made from an aluminium diecasting so that the detachment phenomena by shrinkage of the separating ring material after the penetration are not avoided with certainty.

OBJECT OF THE INVENTION

An object of the invention is, therefore, to provide measures with which a considerable reduction in the level of noise produced by compressors, of a type incorporated in an exhaust-gas turbocharger, is achieved, in which respect not only is an economical solution for the mass production of the compressors to be found, but also the re-equipment of already existing compressors is possible at a low expense. A further objective of the invention is therefore to adopt measures which make trouble-free series production possible and ensure that detachment phenomena of the separating ring from the connection faces are reliably avoided.

It is still a further object of the invention to provide a method of making a compressor housing rear wall comprising a vibration-damping and structure-borne sound damping separating ring.

SUMMARY OF THE INVENTION

In accordance with the present invention, the above objects are achieved in that there is provided a compressor, of a type which can be incorporated in a turbocharger, comprising a compressor housing enclosing a compressor rotor and fastened, by its rear wall, to a stator housing mounting a drive shaft, characterized in that provided in the rear wall of the compressor housing there is at least one encircling separating ring which deadens vibrations and sound conducted through the compressor housing and which connects two adjoining parts of the rear wall to one another.

As a result of the present invention, the conduction of sound through the compressor, from the rotor and the stator to the compressor housing, is considerably damped so that the level of noise radiation can be very greatly reduced. Depending on the construction of the rear wall of the compressor housing, at frequencies of between 600 Hertz and 2000 Hertz noise damping values in the order of 12 dB at low frequencies and over 20 dB at high frequencies have been achieved. In this respect, rotors obtained from normal production and which were not finely-balanced were used.

As a result of the solution proposed by the present invention it is ensured, in an advantageous manner, that in the production of exhaust-gas turbochargers, it is possible to use rotors having maximum production imbalance and the maximum permissible change in operating imbalance without the occurrence of severe noise, which could not previously be avoided during operation.

A further feature of the present invention provides for the fact that, advantageously, two or more separating rings are arranged in the rear wall of the compressor housing. In this respect, the location of the mounting of each separating ring is determined by the ratio of the individual masses of each component of the rear wall to the overall mass of the rear wall and the desired pole positions of the oscillatory system. The advantage of the use of several separating rings is the fact that it provides a series-connected damping system in which, by co-ordinating the mass ratios, the pole positions can be shifted into frequency regions in which the noise radiation is particularly intensive. The design of the separating rings is to a wide extent variable and depends upon the respective constructional features of the rear wall of the compressor housing.

As a further advantageous feature of the present invention is the fact that the or each separating ring is a flat strip element which has a force-locking adhesive connection to the adjacent parts of the compressor housing's rear wall. Preferably, the strip element is provided with projections which are in force-locking adhesive connection with adjacent parts of the rear wall. The, or each, separating ring can be made of a heat and adhesion-resistant elastomer or rubber material which is bonded or vulcanized between the parts of the rear wall. Alternatively, the or each separating ring may consist of a plastics material. In this respect, in the production of the rear wall either highly heat-proof thermoplastics or polyamide materials, can be introduced into the space provided for the separating ring.

The further object is achieved, according to the invention, in that the at least one vibration-damping and structure-borne sound-damping separating ring is surrounded by a metal bushing and connected to the latter in force-locking manner, and that the separating ring carries the outer ring frictionally and/or in a form-locking manner. This embodiment affords the possibility of using, for compressor housing rear walls of different sizes, only a single size for the central disk as regards the model, onto which, in each case, a separating ring with a metal bushing is applied. The different sizes of outer rings of the compressor housing rear wall corresponding to a series are mounted on the metal bushing, preferably by shrinking.

It is also provided that the at least one vibration-damping and structure-borne sound-damping separating ring is disposed between two metal bushings, one of which is connected to the central disk and the other to the outer ring frictionally and/or in form-locking manner. This embodiment is more complicated for serious production but affords the possibility of independent production of a separating ring disposed between two metal bushings. For the assembly, both the central disk and the outer ring are preferably mounted by shrinking.

In a method for establishing at least one vibration-damping and structure-borne sound-damping connection between a central disk and an outer ring of a compressor housing rear wall, according to the present invention, the outer ring is mounted exactly concentrically with respect to the central disk to form a gap for the vibration-damping and structure-borne sound-damping connection, and the vibration-damping and structure-borne sound-damping material of the separating ring is introduced into the gap by casting, pressing, vulcanizing, or the like. In the method described a substantially pressure-free mounting of the separating ring between the outer ring and the central disk is obtained.

For specific uses it may however be desirable for the separating ring to be under a certain pre-tensioning. For this purpose, according to the invention, for the production of a two-part separating ring, the metal bushing is mounted exactly concentrically with the central disk to form a gap for the vibration-damping and structure-borne sound-damping material, the vibration-damping and structure-borne sound-damping material of the separating ring is introduced into the gap by casting, pressing, vulcanizing, or the like, and the outer ring of the compressor housing rear wall is pushed or shrunk onto the metal bushing with pressing of the vibration-damping and structure-borne sound-damping material. As a result, the outer diameter of the metal bushing may be compressed by a predetermined definite amount so that the boundary layer between the separating ring and the metal bushing is under a pressure biasing which counteracts a tendency of the separating ring to detach from the metal. This pressure biasing also passes through the separating ring to the interface between the central disk and the separating ring so that for this interface as well there is no danger of detachment. Finally, according to the invention, for a three-part metal-separating-ring-metal structure the two metal bushings are mounted exactly concentrically with respect to each other to form a gap for the vibration-damping and structure-borne sound-damping material so that the vibration-damping and structure-borne sound-damping material of the separating ring is introduced into the gap by casting, pressing, vulcanizing, or the like, and the inner metal bushing is mounted or shrunk onto the central disk and onto the other the outer ring of the compressor housing rear wall on the outer metal bushing under pressure in a force-locking manner. This embodiment of the invention has the advantage that the three-part structure of metal bushing, separating ring and metal bushing can be premounted separately to use it for various model series of compressor housing rear walls and constructionally differently formed parts of the compressor housing rear wall in the form of the central disk and the outer ring can be combined together. This three-part structure may be expedient if the material used for the separating ring does not enter the desired firm bonding with the aluminium material usually used for the compressor housing rear walls. The three-part structure enables the metal bushings to be made from a material which enters a very intimate bonding and is not liable to detaching with the material of the separating ring.

BRIEF DESCRIPTION OF DRAWINGS

The invention will be described further, by way of example, with reference to the accompanying drawings in which:

FIG. 5 shows a section through a compressor housing rear wall according to a further embodiment of the invention;

FIG. 6 is a perspective exploded illustration of the embodiment of FIG. 5; and

FIG. 7 is a section through a compressor housing rear wall according to a further embodiment of the invention.

DESCRIPTION OF THE PREFERRED EMBODIMENTS

Figure 1:
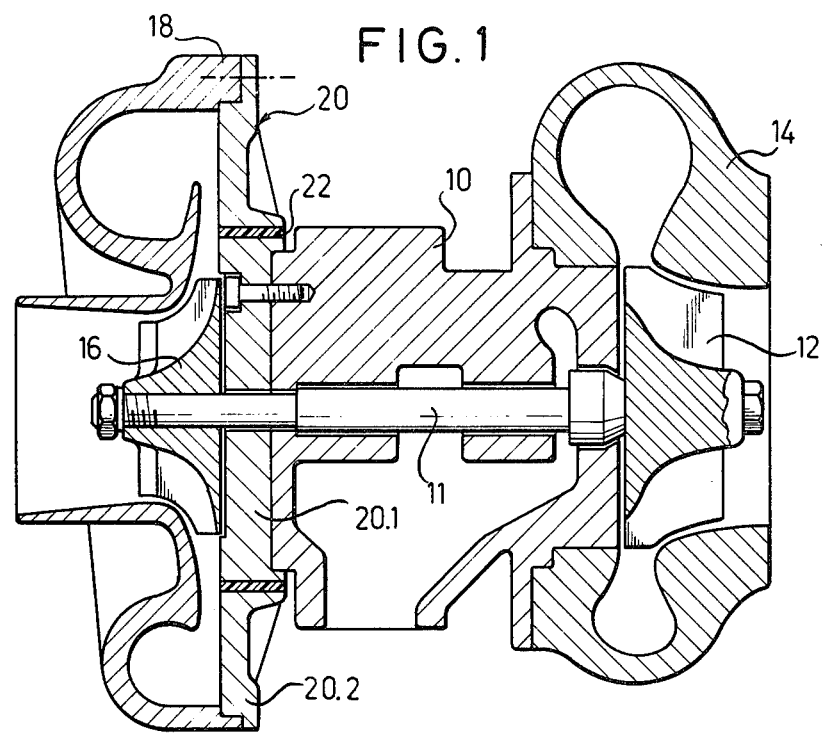
FIG. 1 is a longitudinal section through an exhaust-gas turbocharger incorporating a preferred embodiment of the compressor of the invention.

Referring firstly to FIG. 1, the illustrated exhaust-gas turbocharger comprises a stator 10, in which a rotor shaft 11 is mounted for rotation. The rotor shaft 11 carries, on the right-hand side, i.e. as viewed in FIG. 1, a turbine wheel 12 which is arranged in a turbine housing 14. Mounted on the left-hand side, i.e. as viewed in FIG. 1, of the rotor shaft 11 is a preferred embodiment of the compressor of the invention comprising a compressor wheel 16 which rotates in a compressor housing 18. The compressor housing 18 is sealed off, at its rear end i.e. that end immediately opposite the stator 10, by a rear wall 20. The rear wall 20 is secured to the stator 10 by screws, only one of which screws is symbolically illustrated in FIG. 1.

If, because of imbalances at the turbine wheel 12 or at the compressor wheel 16 respectively, mechanical vibrations or oscillations arise, the same are passed on by way of the stator 10 and are radiated at the compressor housing 18. The resonance phenomena of the system of the compressor housing 18 and the compressor housing's rear wall 20 are of crucial importance for the radiation, in which respect it can be stated that substantial radiation is effected by way of the compressor housing's rear wall 20. In order to counter the conduction of sound, caused by mechanical vibrations, through the compressor housing 18, and to reduce the noise radiation, there is inserted in a region of the rear wall 20 which is exposed on the inside and outside of the housing 18 a separating ring 22 which extends concentrically to the rotor shaft axis 11 over the entire axial thickness of the rear wall 20. This separating ring 22 consists of a heat-resistant elastomer, for example of a heat-resistant rubber material, or of a plastics material, which enters into secure adhesive connection with the two adjacent metallic parts 20.1 and 20.2 of the rear wall 20, so that a force-locking adhesive connection arises between the rear wall 20 and the separating ring 22.

As a result of the separating ring 22, the compressor housing's rear wall 20 is subdivided into a central disc 20.1 and an outer ring 20.2, in which respect the separating ring 22 brings about a damping of sound, conducted through the compressor housing 18, between the central disc 20.1 and the outer ring 20.2.

In experimental constructions of the compressor of the invention, very considerable lowering in the level of noise was obtained using an elastic hot adhesive. The two reference models used both showed, over a frequency curve of about 400 Hertz to 2000 Hertz, a noise abatement of about 10 dB at 400 Hertz with an improvement to about 13 db at 1100 Hertz and a further improvement to over 20 dB at about 1700 Hertz.

The materials used for the separating ring 22 have a good material damping and good mechanical properties at a temperature of 140° C. These properties are fulfilled by highly heat-resistant rubber materials, in which respect a silicone rubber is preferred, as is also a plastics material, for example, polyamides and highly heat-resistant thermoplastics.

The particular dimensions of the separation gap in the rear wall 20, which gap is filled by the separating ring 22, is governed by the material from which the separating ring 22 is made.

Figures 2, 3, 4:
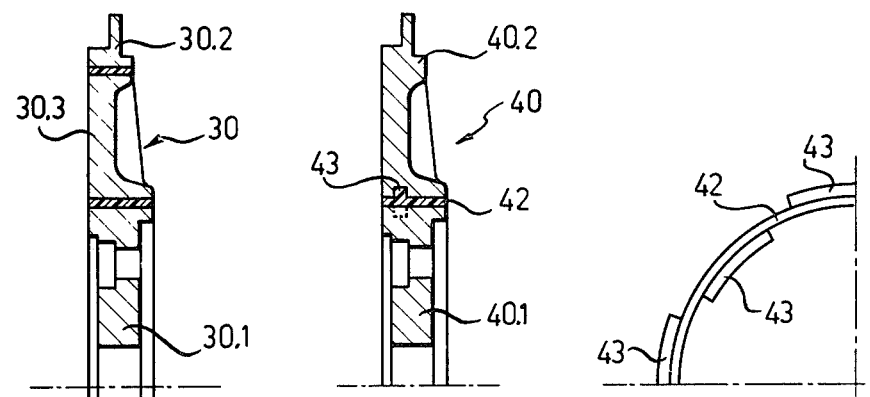
FIG. 2 is a longitudinal section through a further embodiment of a rear wall of a compressor housing of the compressor of FIG. 1.
FIG. 3 is a partial view, in section, through yet a further embodiment of a rear wall of the compressor FIG. 1.
FIG. 4 is a partial plan view of a separating ring of the rear wall of FIG. 3.

FIG. 2 illustrates a further embodiment of the rear wall, designated by reference numeral 30, of the compressor housing 18, which rear wall 30 is subdivided by two separating rings 32 and 33 into three parts. The aforesaid parts are respectively, a central disc 30.1 connected by way of a separating ring 32 to an intermediate ring 30.3 which, in turn, is connected by way of a separating ring 33 to an outer ring 30.2. The connection to the stator 10 is effected by way of the central ring 30.1, whereas the connection to the compressor housing 18 is effected by way of the outer ring 30.2.

As a result of the provision of two separating rings 32 and 33 in the rear wall 30 there arises an intermediate mass which strongly influences the resonance behaviour and which can be strongly influenced by the shaping of the intermediate ring 30.3. Through the use of such intermediate masses, the damping of sound conducted through the compressor housing 18 can be very strongly influenced, in that, in particular, by a coordination of the mass ratios between intermediate mass and total mass, the pole positions of the damping course can be influenced and shifted with regard to its frequency position. In this way it is possible, with the aid of constructional measures, to reduce the noise radiation in an intentional manner, in which respect an optimization for different constructional designs of the compressor housing and of the associated rear wall is possible.

As a result of the measures of the present invention it is also possible to convert exhaust-gas turbochargers already in operation so that there is better deadening of sound conducted through the compressor housing and, therewith, better noise inhibition.

Since, as a result of the measures of the invention, very high damping values can be achieved, a fine balancing of the rotor i.e. the compressor wheel 16, rotor shaft 11 and turbine wheel 12, can be eliminated. In this way considerable production advantages arise.

Although it is not shown in the drawings, an influencing of the damping of sound conducted through the compressor housing 18 can also be effected by separating rings arranged eccentrically to the rotor axis. This can be of advantage more especially when the cross-sectional dimensions of the compressor housing vary severely and thereby unequal mass distributions arise. Such an eccentric arrangement of the or each separating ring has, through its affect on the mass variations of the individual parts of the rear wall, a corresponding affect on the resonance phenomena in the compressor housing and the rear wall.

Illustrated in FIGS. 3 and 4 is a further embodiment of the rear wall, designated by reference numeral 40, of the compressor housing 18 comprising a separating ring 42 provided, on its inside and its outside, with projections 43. The projections 43 engage into corresponding recesses on the end face of central disc 40.1 and outer ring 40.2 of the rear wall 40. The production of such a separating ring 42 can be effected in such a way that its component parts, produced, for example, from aluminum die cast metal, are inserted into an injection mould, in which respect a gap, corresponding to the thickness of the separating ring 42, is provided which is injected with a plastics material to form the separating ring 42. Instead of the plastics material, a rubber material can be used, which rubber material is bonded with or is vulcanized between the metal parts. Through the use of a separating ring 42 having projections 43 which extend in a rib-shaped manner over portions of the inner and outer peripheries of the rear wall 40, a force-locking adhesive connection is ensured.

The compressor housing rear wall 50 illustrated in FIG. 5 comprises an outer ring 50.1 and a central disk 50.2 between which a separating ring 52 of a vibration-damping and structure-borne sound-damping material and a metal bushing 53 is disposed. A compressor housing rear wall of the same structure is illustrated in exploded perspective view in FIG. 6.

To make such a compressor housing rear wall, the outer ring 50.1 and the central disk 50.2 are made from aluminum diecasting and subjected to a surface finishing to bring the surfaces engaging the separating ring 52 and the metal bushing 53 to the necessary dimensional accuracy. For assembly, the metal bushing 53 is first placed exactly concentrically about the central disk 50.2 so that a gap is defined for the vibration-damping and structure-borne sound-damping intermediate layer. Into this gap a suitable material is introduced by casting, pressing or another suitable method. When a rubber material is used it is subjected to a vulcanizing process. This forms the separating ring 52 which adheres firmly on the one hand to the central disk 50.2 and on the other hand to the metal bushing 53. After completion of the separating ring, the outer ring 50.1 is applied to the metal bushing 53 in such a manner that a force-locking connection is formed. Of particular advantage is shrinkage of the outer ring, because by careful calibration it can be ensured that the metal bushing 53 is subjected to a certain pressure compressing the bushing. This slight deformation produces a very good permanent bonding in the interlayer region between the separating ring and the adjoining metal surface and consequently no detachment phenomena occur in subsequent operation.

In the embodiment illustrated in FIG. 7 a three-part structure is shown comprising an outer metal bushing 63, a separating ring 62 and an inner metal bushing 64. This structure is more complicated in production, but has the advantage that the three-part connecting element can be made independently of the remaining parts of the compressor housing wall. In particular, this has the advantage that for the separating ring 62 materials can also be used with which a satisfactory bonding to an aluminum surface is not guaranteed. In this case, however, the material composition for the metal bushings may be selected so that a good bonding is ensured between the separating ring and the metal bushings. By shrinking the three-part structure onto the central disk 60.2 and by shrinking on the outer ring 60.1 it can further be ensured that the separating layer 62 is subjected to a pressure load and reliably prevents detachment of the separating layer from the metal bushings.

In the formation of the three-part structure the inner metal ring 64 is mounted concentrically with the outer metal ring 63 and the resulting gap is filled with the material for the separating ring, this material being introduced by casting, pressing or in another suitable manner. When using rubber, a vulcanizing operation is carried out to ensure a firm bonding of the separating ring to the metal bushings.

The embodiment of the invention according to FIGS. 5 to 7 further has the advantage that for a great number of different diameters for the compressor housing rear walls of an entire model series, identical central disks can be used, it merely being necessary to adapt the outer ring to the individual types of a series in accordance with the changes in the dimensions. This step reduces the production expense and enables the compressor housing rear wall to be made relatively inexpensively.

We claim:

1. In a compressor for a turbocharger in which a compressor housing encloses a compressor wheel and includes an end wall which is fastened to a stator housing, and in which the stator housing rotatably mounts a drive shaft for the compressor wheel, the improvement wherein:
said end wall comprises a disc including an aperture receiving the drive shaft therethrough;
at least one ring generally coplanar with and disposed about said disc; and
a resilient ring between and connecting said disc and said at least one ring for deadening vibration and sound transmission through the compressor housing.

2. The improvement of claim 1, and further comprising:
an additional ring generally coplanar with and disposed about said at least one ring; and
an additional resilient ring between and connecting said at least one ring and said additional ring.

3. The improvement of claim 1, wherein:
said resilient ring comprises a flat strip frictionally fit between said disc and said at least one ring.

4. The improvement of claim 3, wherein:
said flat strip comprises a plurality of spaced-apart projections extending radially with respect to the drive shaft; and
said at least one ring and said disc each include recesses receiving said projections.

5. The improvement of claim 3, wherein:
said resilient ring comprises a heat-resisting elastomeric material bonded between said disc and said at least one ring.

6. The improvement of claim 3, wherein:
said flat strip comprises a resilient synthetic material.

7. The improvement of claim 3, wherein:
said disc and said at least one ring comprise complemental shapes which locate said flat strip eccentrically with respect to the axis of rotation of the drive shaft.

8. In a compressor for a turbocharger in which a compressor housing encloses a compressor wheel and includes an end wall which is fastened to a stator housing, and in which the stator housing rotatably mounts a drive shaft for the compressor wheel, the improvement wherein:
said end wall comprises a central disc including an aperture receiving the drive shaft therethrough, an outer ring substantially coplanar with said disc, a metal bushing mounted within and secured to said outer ring, and a resilient ring between and connecting said metal bushing and said disc for deadening vibration and sound transmission through the compressor housing.

9. In a compressor for a turbocharger in which a compressor housing encloses a compressor wheel and includes an end wall which is fastened to a stator housing, and in which the stator housing rotatably mounts a drive shaft for the compressor wheel, the improvement wherein:
said end wall comprises a disc including an aperture receiving the drive shaft therethrough, a ring generally coplanar with and disposed about said disc, a resilient separating ring between the first-mentioned ring and said disc, a first metal bushing secured to the first-ring and the separating ring, and a second metal bushing secured between said disc and said separating ring for deadening vibration and sound transmission through the compressor housing.

10. In a compressor for a turbocharger in which a compressor housing encloses a compressor wheel and includes an end wall which is fastened to a stator housing, and in which the stator housing rotatably mounts a drive shaft for the compressor wheel, the improvement wherein:
said end wall comprises a disc including an aperture for receiving the drive shaft thereto;
at least one ring generally coplanar with and disposed about said disc; and
damping means mounted between said disc and said one ring and including a resilient ring for deadening vibration and sound transmission through the compressor housing.

* * * * *